United States Patent
Foti et al.

(10) Patent No.: US 7,840,471 B2
(45) Date of Patent: Nov. 23, 2010

(54) LIFE INSURANCE INVESTMENT FUND

(75) Inventors: Samuel J. Foti, Greenwich, CT (US); Samuel Chiodo, Bonita Springs, FL (US); Evelyn L. Peos, Watchung, NJ (US)

(73) Assignee: Halley Capital LLC, Stamford, CT (US)

( * ) Notice: Subject to any disclaimer, the term of this patent is extended or adjusted under 35 U.S.C. 154(b) by 0 days.

(21) Appl. No.: 12/621,095

(22) Filed: Nov. 18, 2009

(65) Prior Publication Data
US 2010/0063853 A1    Mar. 11, 2010

Related U.S. Application Data

(63) Continuation of application No. 11/837,719, filed on Aug. 13, 2007, now Pat. No. 7,640,202.

(60) Provisional application No. 60/822,324, filed on Aug. 14, 2006.

(51) Int. Cl.
G06Q 40/00 (2006.01)
(52) U.S. Cl. .................. 705/36 R; 705/4
(58) Field of Classification Search ............... 705/36 R
See application file for complete search history.

(56) References Cited

U.S. PATENT DOCUMENTS

| | | | |
|---|---|---|---|
| 5,136,502 | A | 8/1992 | Van Remortel et al. |
| 5,974,390 | A | 10/1999 | Ross |
| 6,330,541 | B1 | 12/2001 | Meyer et al. |
| 7,080,050 | B1 | 7/2006 | Himmelstein |
| 7,698,158 | B1 * | 4/2010 | Flagg ..................... 705/4 |
| 2002/0035489 | A1 | 3/2002 | Herman et al. |
| 2002/0198802 | A1 | 12/2002 | Koresko |
| 2004/0064391 | A1 | 4/2004 | Lange |

(Continued)

FOREIGN PATENT DOCUMENTS

EP    0 332 770 A1    9/1989

(Continued)

OTHER PUBLICATIONS

Bonded Life Settlements, www.profinancialgroupinc.com/index.php?s=15, 3 pages.

(Continued)

*Primary Examiner*—Charles R Kyle
*Assistant Examiner*—David L Wood
(74) *Attorney, Agent, or Firm*—Ostrolenk Faber LLP

(57) ABSTRACT

A method of funding and managing a fund of diverse life insurance policies issued by investment grade carriers, the fund providing enhanced risk adjusted investment return. The method includes selecting, using computer enabled instructions, the life insurance policies for the fund without underwriting on the lives of the insured of each life insurance policy, the step of selecting based on a cash value analysis of the life insurance policies to identify those policies with viable projected cash value streams and that can be positively impacted to improve the cash value streams; acquiring, using computer enabled instructions, the selected life insurance policies for the fund, wherein benefits of life insurance policy ownership pass to the owners of the fund; and managing the fund, using computer enabled instructions, to maximize a financial risk adjusted investment rate of return that provides equity level returns with fixed income asset exposure.

31 Claims, 5 Drawing Sheets

U.S. PATENT DOCUMENTS

| | | | |
|---|---|---|---|
| 2004/0177021 | A1 | 9/2004 | Carlson et al. |
| 2004/0199446 | A1 | 10/2004 | Lange |
| 2004/0267647 | A1 | 12/2004 | Brisbois |
| 2005/0187869 | A1 | 8/2005 | Buerger |
| 2005/0192849 | A1 | 9/2005 | Spalding, Jr. |
| 2005/0216316 | A1 | 9/2005 | Brisbois et al. |
| 2006/0293992 | A1 | 12/2006 | Blair |

FOREIGN PATENT DOCUMENTS

| | | | |
|---|---|---|---|
| WO | WO 2005/020000 | A2 | 3/2005 |

OTHER PUBLICATIONS

Lansdown Atlantic Life Settlement Fund, www.investoffshoredirect.com/Default/Lansdown_Atlantic_Life_Settlement_Fund, 3 pages.

Life Settlement Firm Launches Hedge Fund, www.financialnews-us.com/index.cfm?page=uscomment&contentid=1045288517, 2 pages.

Life Settlements Fund, www.lifesettlementsfund.com/pages/fund.php?p=45, 2 pages.

Life Settlement Fund Launches in Australia, www.lisassociation.org/vlsaamembers/news/files/lisa_othernews_12_february_2007_financialstandard.com.au_Life_Settlement_Fund_Launches_in_Australia.pdf; 1 page.

A Lively Market in Death Bonds, online.wsj.com/article/SB117202515665914431-search.html?KEYWORDS=insurance+invest&COLLECTION=wsjie/6month, 4 pages.

Putting Your Life Insurance on the Block, online.wsj.com/article/SB117478059693448121-search.html?KEYWORDS=insurance+invest&COLLECTION=wsjie/6month, 3 pages.

Swiss Re Completes Second Securitization of in-Force Life Insurance Policies Worth USD 370 Million, www.swissre.com/internet/pwswpspr.nsf/fmBookMarkFrameSet?ReadForm&BM=../vwAllbyIDKeyLu/bmer-6kbcyy?OpenDocument, 2 pages.

Safety and Yields on the Secondary Market, www.mpc-capital.de/contell/cms/server/mpc-capital_com/Product_Portfolio/Life_Insurance_Funds/index.html;jsessionid=0CF9810AB55BB677E759831899A946AF, 1 page.

US Life Settlements, http://www.uslifesettlements.com/life-settlement-process.htm, 3 pages.

Ben G. Baldwin, Jr., "Understanding and managing VUL" Jouranl of the American Society of CLU and CHFC. Sep. 1996. vol. 50, Iss. 5; p. 82-95.

Tom Bakos, Diri Parankirinathan, j"The Life Settlement Market is an Opportunity" Journal of Structured Finance. New York. Summer 2006. vol. 12, Iss. 2; p. 46-49.

Holman W. Jenkins Jr., "The Life Insurance Industry's Grim Reapers," The Wall Street Journal Asia. Hong Kong: Aug. 10, 2006. p. 14.

Allison Bell, "IRS Settlement Program Could Affect 412(i) Plans and Others," National Underwriter. Life & Health. Erlanger: Nov. 14, 2005. vol. 109, Iss. 43; p. 50.

R Marshall Jones, Stephan R Leimberg, Lawrence J Rybka, "Free Life Insurance: Risks and Costs of Non-Recourse Premium Financing" Estate Planning. New York. Jul. 2006. vol. 33, Iss. 7, p. 3-15.

Timothy P. Malarkey; Stephan Re Leimberg, "Innovative Planning With No Lapse Guarantee Life Insurance" Estate Planning; Jul. 2005; 32, 7; ProQuest Central, p. 3-17.

Nemo Perera; Brian Reeves, "Risk Mitigation for Life Settlements" Journal of Structured Finance; Summer 2006; 12, 2; ProQuest Central, p. 55-60.

\* cited by examiner

LIFE INSURANCE INVESTMENT FUND

CROSS-REFERENCE TO RELATED APPLICATION

This is a continuation of U.S. patent application Ser. No. 11/837,719 filed Aug. 13, 2007 and entitled LIFE INSURANCE INVESTMENT FUND, which application is based on and claims priority to U.S. Provisional Patent Application Ser. No. 60/822,324, filed on Aug. 14, 2006 and entitled LIFE INSURANCE INVESTMENT FUND, the entire disclosures of which are hereby incorporated by reference.

BACKGROUND OF THE INVENTION

The present invention relates to funding and operation of an investment portfolio of funds of life insurance policies focused on a fundamental investment opportunity provided by a life insurance policy ownership.

By their nature, life insurance contracts are long term. However, insurance companies will lose 35-45% of policies issued in any given year by the fifth year; 50-60% of the policies by the tenth year, and 70-80% of these policies by the twentieth year. These high rates of lapse have a great impact on insurance companies' costs, which translate into higher costs for life insurance policy holders.

The above-described rates of loss are caused by the life insurance policy holders that forfeit their policies for reasons including: an inability to pay premiums, an urgent need for cash, and change in investment and insurance needs. These reasons and the life insurance policy holders' need to recoup whatever value has vested in their policies, in fact, gave rise to the viatical and life settlement companies. The viatical and life settlement companies redeem to the life insurance policy holders amounts of cash greater than what was inherent in their insurance policies, i.e. the cash surrender value.

These developments are of foremost concern to the insurance companies because third parties, i.e., viaticals and life settlement companies, entities that perform extensive financial and medical underwriting, yet have no insurable interest in the originally insured life insurance policy holders become owners of the insurance policies.

The viatical and life settlement companies select and purchase existing life insurance policies in accordance with the so-called viatical settlement and life settlement provider programs that are common in the life insurance industry. In accordance with these programs, the existing life insurance policies of individuals with relatively short life expectancies due to an illness and/or advanced age are acquired. These policies are sometimes referred to as "impaired lives".

The "impaired lives" life insurance policies are generally owned by the individuals whose lives are being insured and the viatical and life settlement companies purchase these life insurance policies only following a medical review of the insured. The "underwriting" decisions and the amount the viatical and life settlement companies will offer to pay for such life insurance policy, are based fundamentally on an assessment of mortality of the insured.

Surrender or sale of a life insurance policy to the viatical and life settlement companies is detrimental to the Insurance companies. Continuous ownership by the insured, called "policy persistency", will benefit the insurance companies by providing them with additional income from collection of more premiums and/or more fees for providing insurance coverage;
  additional investment income from investment of the collected premiums and fees;
  lower expense unit costs because
    1. there are more policies to spread costs to and
    2. renewed policies are less costly to maintain than newly issued policies;
  for Generally Accepted Accounting Principles (GAAP) purposes, acquisition costs, which can be amortized more slowly;
  less cash surrender values paid out;
  lower reserves, which need to be set aside; and
  as a corollary, better mortality, which would allow companies to lower their premium rates and/or insurance charges.

While maintenance of the ownership by the insured ultimately forces the insurance companies to pay higher dividends and death benefits, this downside is outweighed by the above-listed benefits.

What is needed is a cost-effective solution to the life insurance policy holders' changing financial needs that does not involve a life insurance policy surrender or sale to the viatical and life settlement companies. This solution should help eliminate premiums, provide cash, or provide a better or different investment and/or insurance solutions that will satisfy the life insurance policy holders by 1) helping to avoid ownership of existing life insurance policies by third parties;
2) encouraging retention of the original life insurance policies by providing more attractive returns to the life insurance policy holders and/or by reducing overall costs
    a) without requiring medical/lifestyle/personal underwriting of the lives insured, and
    b) without relying on the expected near term mortality of the lives insured as the source of investment returns; and
3) building the funds without relying on
    a) trusts that purchase variable life insurance contracts on the lives of a select group of employees covered by the trust,
    b) individual supporters of a foundation grouped together in one or more blocks where insurance is taken out on the group for the benefit of the foundation, and
    c) variable life insurance to fund 412(i) defined benefit plans.
        (The 412(i) plan is a tax-qualified, defined benefit pension plan for business owners and their employees that must be funded with a combination of life insurance and annuities, or annuities alone.)

SUMMARY OF THE INVENTION

It is an object of the present invention to enable the owners of the life insurance policies to monetize their investments without requiring execution of life settlement contracts or so called viatical agreements thereby preventing early termination of the individuals' life insurance policies.

It is another object of the present invention to create life insurance policies' funds funded by life insurance policies, wherein the interest in these funds is exchanged to owners of the life insurance policies for their policies.

It is still another object of the present invention to provide the life insurance policies' funds that accept acquisitions of the life insurance policies without requiring medical/lifestyle or personal underwriting on the lives of these insured by these life insurance policies.

It is a further object of the present invention to enable the owners of the exchanged life insurance policies to purchase new life insurance policies on terms more compatible with their current circumstances.

It is still a further object of the present invention to enable the created life insurance policies' funds to provide an attractive return to investors in the funds.

Provided is a method of funding and managing at least one fund of a plurality of diverse life insurance policies issued by a plurality of investment grade carriers, the at least one fund providing enhanced risk adjusted investment return. The method performing the steps of: selecting the plurality of life insurance policies for the at least one fund without underwriting on the lives of the insured of each life insurance policy; acquiring the selected plurality of life insurance policies for the at least one fund; and managing the fund to maximize a financial risk adjusted investment rate of return that provides equity level returns with fixed income asset exposure.

Other features and advantages of the present invention will become apparent from the following description of the invention that refers to the accompanying drawings.

DETAILED DESCRIPTION OF EMBODIMENTS OF THE INVENTION

The present invention describes formation and management of investment funds comprised of life insurance policies. The formation is achieved through selection and acquisition of existing life insurance policies. Importantly, the selection of life insurance policies is achieved independent of medical, lifestyle, or personal underwriting on the lives of those insured by these policies.

Equally important, the selected life insurance policies are acquired without execution of the life settlement contracts or so called viatical agreements, allowing the policy owner to maintain ownership tax advantages of their exchanged policies.

Formation

Figure 1:
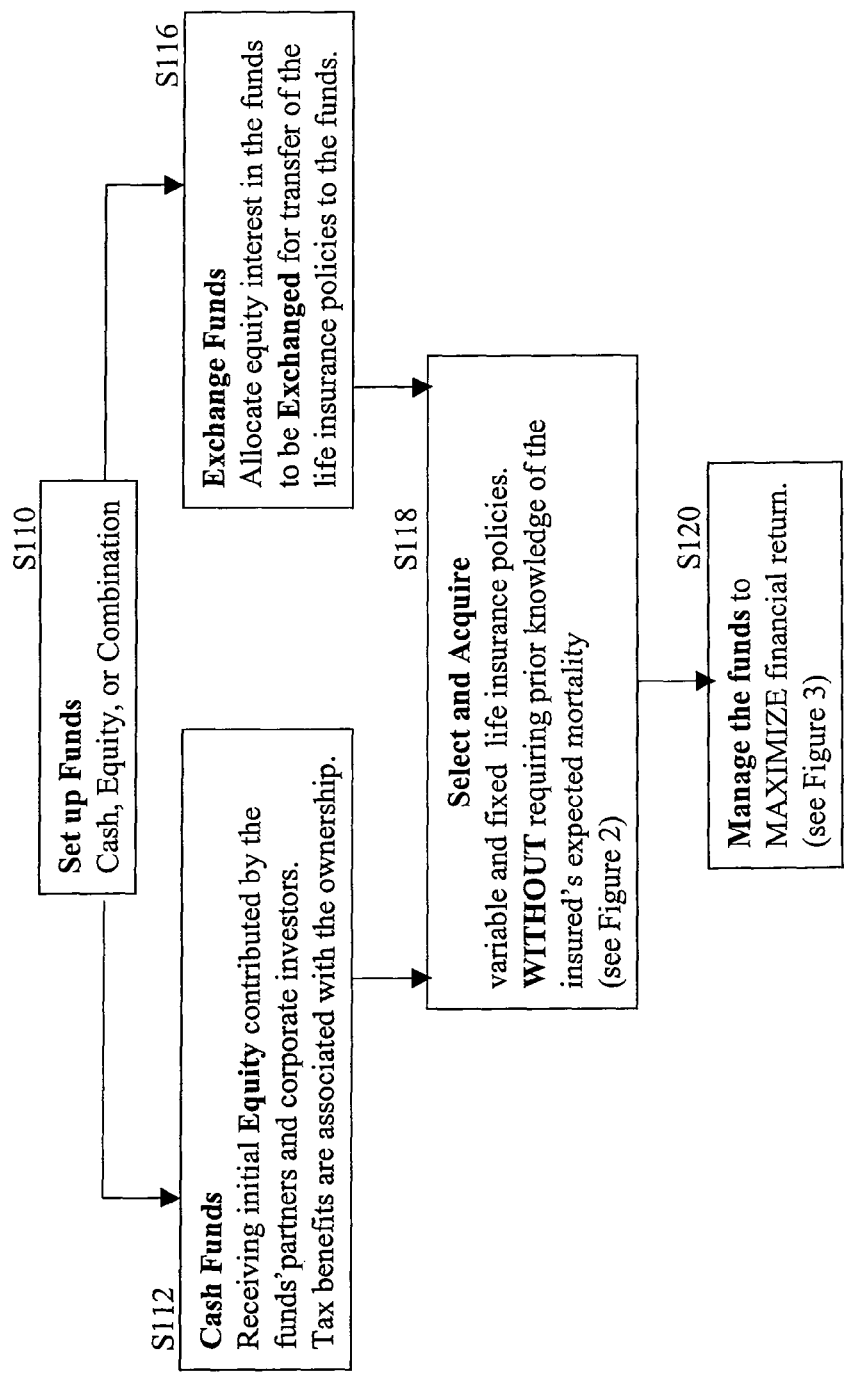
FIG. 1 is a flowchart showing the method steps of fund initiation, life insurance policy selection and fund management to maximize risk-adjusted financial returns of an embodiment of the present invention.

FIG. 1 illustrates progression of formation and management of the investment funds as achieved in a preferred embodiment of the present invention. First, as indicated in step S110 various fund types are established. The funds may be business entities, for example limited partnership or limited liability companies. Once legally set-up, each of the funds will acquire the life insurance policies.

It is understood that as intended for the present application, the funds may be funded by large amounts of diversified life insurance policies from numerous investment grade life insurance carriers, thereby spreading the risk, enhancing the safety of the investment, and providing attractive risk adjusted investment returns to investors. The life insurance policies may be acquired for cash or exchanged for an interest in the funds, creating Cash and Exchange funds, respectively. Step S112 illustrates the establishment of a Cash fund. The initial equity may be contributed by the funds' investors. In return, the funds' investors receive the investment and tax benefits associated with the ownership of life insurance policies.

The cash amount paid for the life insurance policies in the Cash funds will generally equal the cash surrender value of the life insurance policy plus an additional amount generally expressed as a percentage of the cash value. Initial equity required for acquisition of the life insurance policies may be contributed by the funds' partners and corporate investors, directly or through investment vehicles of various forms.

Step S116 illustrates the establishment of an Exchange fund. It is understood that while the owners of the exchanged life insurance policies no longer retain the death, surrender, or investment return benefits of their original policies and can no longer make changes to their original policies, they retain life insurance policy ownership tax advantages, receive proportionate share in the life insurance policies' fund's cash flows and investment growth, and diversify their investments.

Interest in the funds may be allocated in exchange for transfer of the previously owned life insurance policies to the funds. In the Exchange funds, the life insurance policies may be transferred to the funds by the life insurance policies' owners in exchange for an equity interest in the funds. Such exchange transactions may be attractive to the owners of the life insurance policies for the following reasons:

1. the owners of the life insurance policies may be able to retain some benefits of ownership, e.g., tax benefits, while at the same time diversifying their investment by acquiring an interest in the life insurance policies issued to other owners by diverse carriers;
2. the exchange of the life insurance policies for an equity interest in the funds is generally intended to be exempt from Federal income tax;
3. such exchange transactions provide the inherent investment characteristics of equity in the funds;
4. the exchanged policies' cash values may be leveraged and monetized by the fund with distributions made to the previous life insurance policy owners, these distribution are intended to be exempt from Federal income tax; and
5. the leveraged monetized cash values are intended to be an off balance sheet item to the previous life insurance policy owners through the issuance of non-recourse debt secured by the fund.

After the funds are established, the selection and acquisition of life insurance policies, e.g., variable and fixed life insurance policies, is initiated, as shown in step S118. Knowledge of the insured ages and genders will be required for performing the selection of the life insurance policies. Similarly, as discussed above, knowledge of the financial characteristics of the life insurance policy and the financial characteristics of the insurer will be required. After selection and acquisition, the funds are managed to maximize financial return in step S120.

Selection and Acquisition

It is understood that as intended for the present application, the acquired individual or group life insurance policies may be generally owned by or issued to private individuals, corporations, banks, trusts, charitable organizations, employee benefit plan trustees to insure the lives of their employees, and etc. Therefore, the life insurance policies may be acquired from private individuals, corporations, banks, trusts, charitable organizations, etc. Additionally, applicable life insurance policies may include variable life insurance policies that allow for investment discretion by the owner as well as fixed life insurance policies that reflect the results of the general account assets of the insurer.

Figure 2:
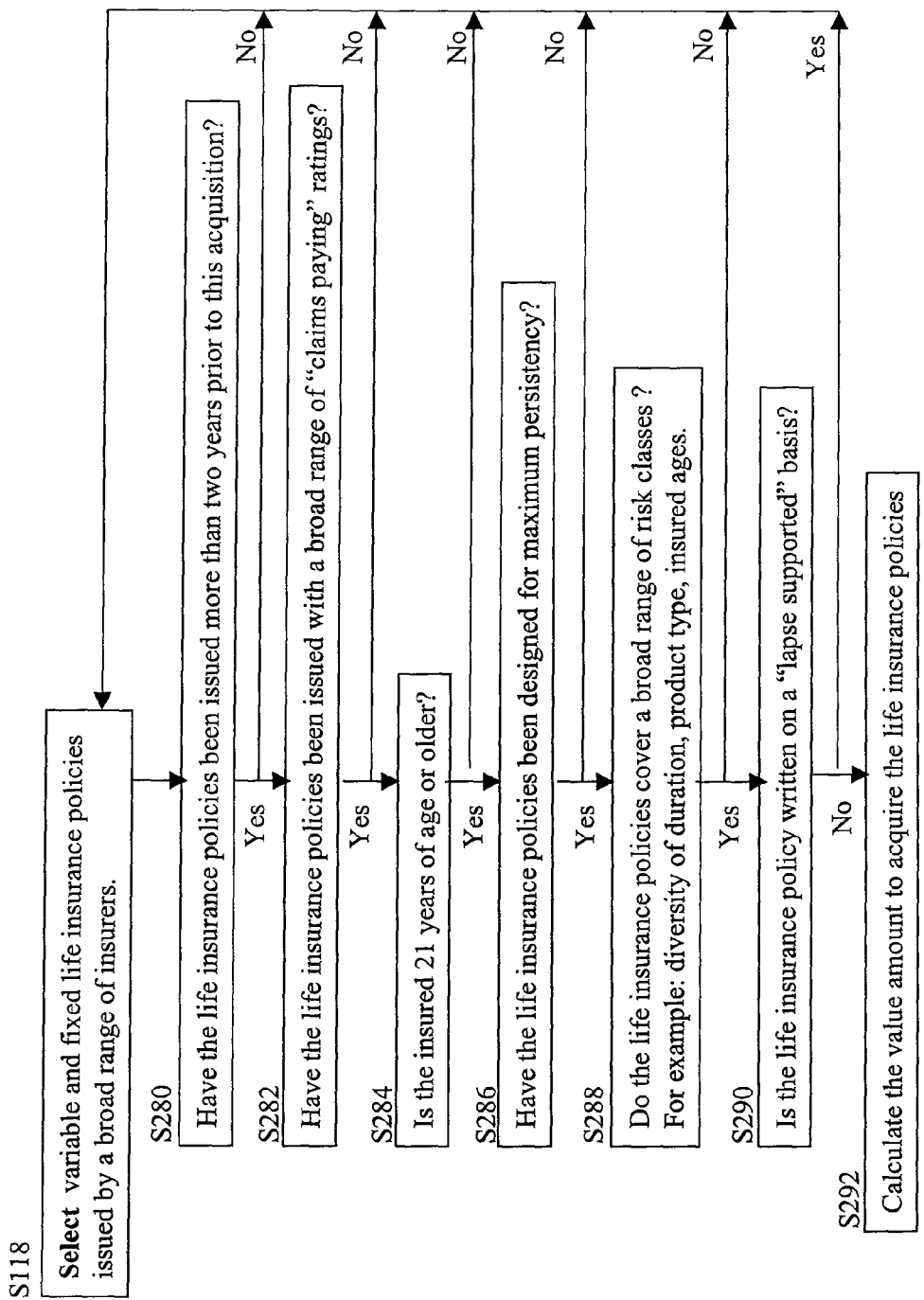
FIG. 2 is a flowchart showing the steps of life insurance policy selection by adherence to rules set by an embodiment of the present invention.

The funds will adhere to rules regarding the types of life insurance policies acceptable to the funds, for example, in one embodiment the rules may be applied as illustrated in FIG. 2. The selection of the life insurance policies, e.g., corporate and bank owned variable and fixed life insurance policies, that were issued by a broad range of investment grade insurers is initiated in step S218 and culminates in the acquisition of the insurance policies for a value calculated in step S292, either for cash or an interest in the fund depending on the type of the fund.

That calculated value is based on the cash surrender value of the life insurance policies. The rules for selection are shown in steps S280-S290 and include determining and ensuring that the selected life insurance policies adhere to the following:

have been issued more than two years prior to this acquisition, as in step S280;
have been issued by a broad range of insurers with investment grade "claims paying" ratings, as in step S282;
the insured is 21 years of age or older, as in step S284;
have been designed for maximum persistency, as in step S286, since these life insurance policies provide the best long-term financial performance to the fund;
cover a broad range of risk classes, as in step S290, e.g., diversity of duration, product type, insured ages and gender; and
not written by an insurer under a "lapse supported" pricing assumption, as in step S292, the funds' management, to the best of its ability, will ascertain whether a life insurance policy appears to be priced using a "lapse supported" methodology.

Additionally, the acquired life insurance policies must cover an acceptable range of insured ages and a broad range of investment grade insurance companies and the funds must not "initiate" life insurance policies to be purchased.

Furthermore, the funds will not require determination of the mortality expectation of the insured under the life insurance policy being acquired. This allows the funds to avoid violating the privacy of the insured and thus avoiding medical underwriting/exams and questionnaires, obtaining information from third-party medical information services, and reviewing life style characteristics of the insured.

During acquisition, the funds will analyze the financial characteristics of the life insurance policies. For example, the expected financial performance of the life insurance policies given premium payments, guaranteed cash values, forecasted dividends, variety and nature of investment options, variety and nature of dividend options, variety and nature of settlement options, loan provisions and loan interest, net present value analysis of premium payments, cash values, etc.

Figure 3:
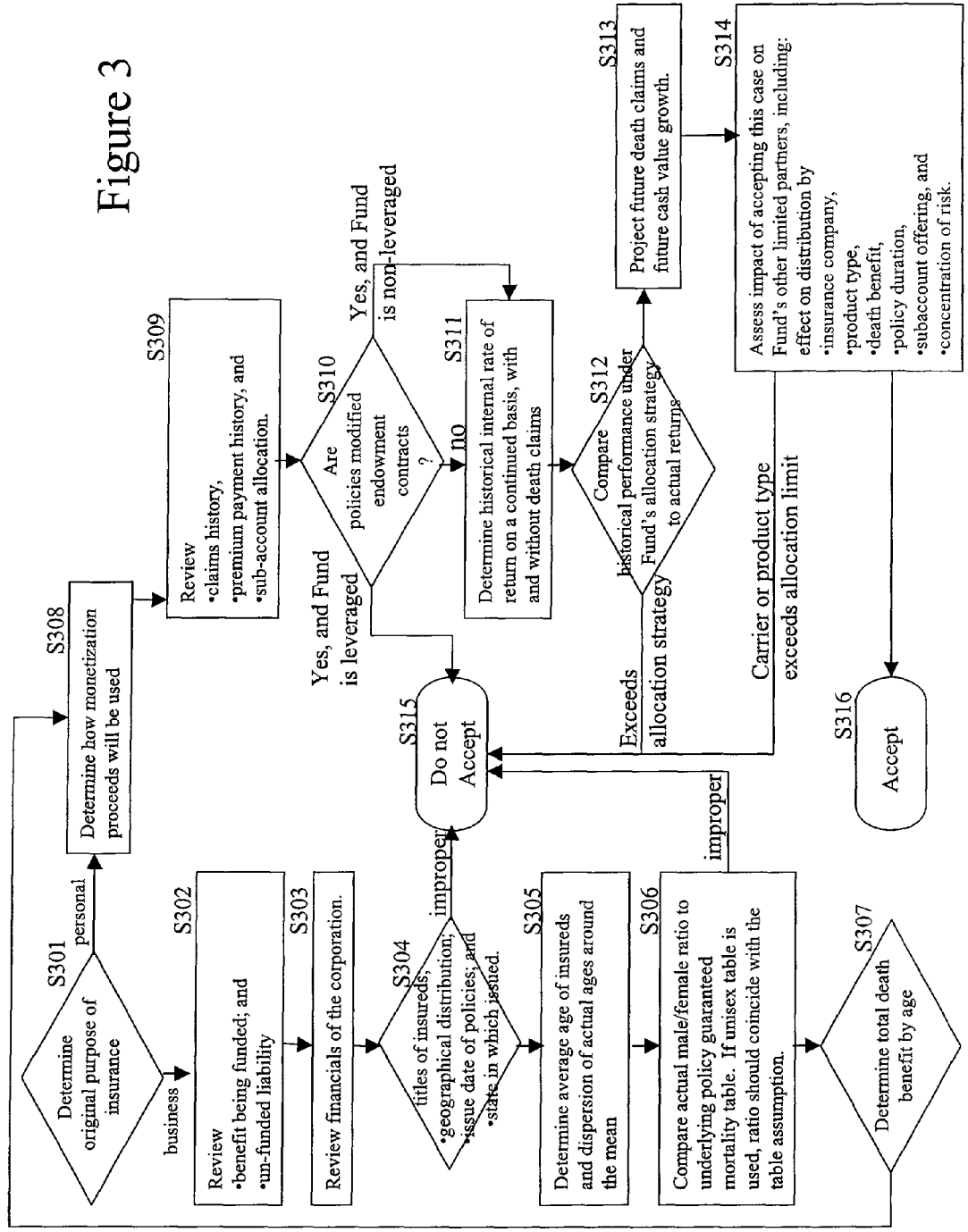
FIG. 3 is a flowchart showing exemplary steps of a process for selection of insurance policies into leveraged and non-leveraged funds.

An example of a selection process is illustrated in FIG. 3. As shown, in step S301, the original purpose of insurance is determined. If the original purpose is personal, processing continues in step S308. If the original purpose is business, in step S302 the policies are reviewed to determine if the benefit is being funded, and whether the liability is unfunded. If the life insurance policy is owned by a corporation, in step S303 financials of the owner corporation are reviewed.

In step S304 titles of the insured; geographical distribution; issue date of policies and state in which issued are reviewed. If any of the information is found to be improper, the processing branches to step S315 where the life insurance policy is not accepted. In step S305 average age of insured and dispersion of actual ages around the mean is determined. In step S306 actual male/female ratio is compared to underlying life insurance policy guaranteed mortality table, if unisex table is used, ratio should coincide with the table assumption. In this step, if ratios are improper the processing will branch to step S315 where the life insurance policy is not accepted. In step S307 total death benefit by age are determined and the processing is transferred to step S308 for a determination of how monetization proceeds will be used is made.

In step S309 claims history, premium payment history, and subaccount allocation are reviewed. In step S310, if the policies being examined are modified endowment contracts (MEC) for a leveraged fund, the selection process proceeds to step S315, where the life insurance policy is discarded. Otherwise, if the policies are not MECs or MEC for a non-leveraged fund, processing continues in step S311 where historical internal rate of return on a continued basis is determined with and without death claims.

In step S312 historical performance under fund's allocation strategy is compared to actual returns. If the determined actual returns exceed the current fund's allocation strategy, the life insurance policy is discarded in step S315. Otherwise, in step S313 future death claims and future cash value growth are projected.

In step S314 impact of accepting this case on fund's other limited partners, including effect on distribution by insurance company, product type, death benefit, policy duration, subaccount offering, concentration of risk is assessed. In accordance with a preferred embodiment of the present invention, there may be limits with respect to a percentage of the fund's policies that come from one carrier. If that allocation limit percentage or the allocation of whole life policies are exceeded, the life insurance policy is discarded in step S315. Otherwise, in step S316, the life insurance policy is accepted.

Figure 4:
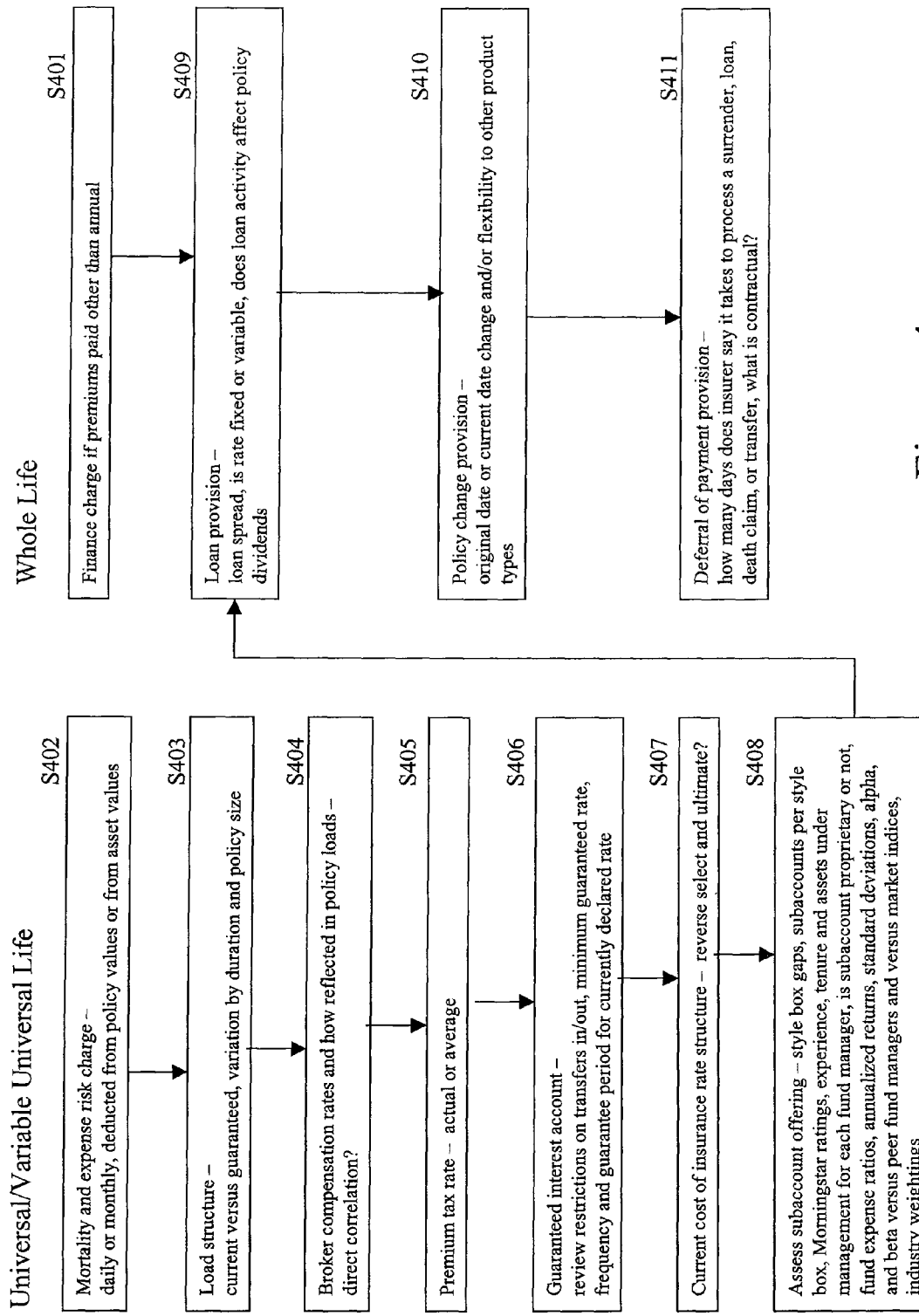
FIG. 4 is a flowchart showing a process for determining adherence of a design of the selected insurance policies to certain rules and policies.

In addition, it is preferred that selected policies are designed in accordance with certain rules. FIG. 4 illustrates a process for determining the adherence to these rules. In accordance with the sequence of steps in FIG. 4, the Whole Life policies are examined in steps S401 and S409-S411 and Universal Life/Variable Universal Life insurance policies are examined in steps S402-S411. Accordingly, steps S409-S411 are used in common for the Whole Life and Universal Life/Variable Universal Life policies.

In step S401 the Whole Life policies are examined to determine if a finance charge applies to premiums paid other than annual Whole Life. As stated, examination of the Whole Life policies continues at step S409 described below.

Examination of Universal Life/Variable Universal Life policies begins in step S402, where it is determined if mortality and expense risk charge is daily or monthly and deducted from life insurance policy values or from asset values. In step S403 it is determined if a load structure is current versus guaranteed and if there is a variation by duration and policy size. In step S404 broker compensation rates are determined and also how the compensation rates are reflected in the life insurance policy loads, e.g., a direct correlation. In step S405 it is determined if a premium tax rate is actual or average. In step S406 it is determined if guaranteed interest account includes restrictions on transfers in/out, minimum guaranteed rate, frequency, and guarantee period for currently declared rate. In step S407 it is determined if the current cost of insurance rate structure is reverse select and ultimate. And in step S408 subaccount offerings are assessed to determine style box gaps, subaccounts per style box, Morningstar ratings, experience, tenure and assets under management for each fund manager, is subaccount proprietary or not, fund expense ratios, annualized returns, standard deviations, alpha, and beta versus peer fund managers and versus market indices, industry weightings.

Examination of Whole Life and Universal Life/Variable Universal Life policies continues in step S409, this step determines if a loan provision has a low loan spread, fixed or variable rate, and if any loan activity affects policy dividends. In step S410 it is determined if a life insurance policy change provision is the original date or current date change and/or offers flexibility to other product types. And, in step S411, for a deferral of payment provision it is determined how many days the insurer says it takes to process a surrender, loan, death claim, or transfer, and what is a contractual obligation.

Furthermore, the funds will analyze characteristics of the insurers of the life insurance policies. For example, financial strength ratings, history of dividend performance, expected future dividend performance, strength of management, commitment to customers, etc. Because of the funds' institutional knowledge of the industry, the funds will effectively gather and analyze such information and provide added value and enhanced risk adjusted investment rates of equity level returns with fixed income asset exposure. It is preferable that the policies accepted by the fund be issued by acceptable U.S. domiciled insurance companies that

- have investment grade rating;
- have a history of the life insurance policy dividend actions;
- assess financial strength of insurance companies;
- assess supportability of current dividend scale;
- provide access to the life insurance policy information on-line or telephone automation;
- provide ease of adding new subaccounts;
- provide quick turn around to process service requests;
- offer private placement products;
- provide an additional amount of guaranteed issue; and
- provide additional amounts of insurance under retention limits and reinsurance programs.

Management

After being established, all funds will be managed to achieve the highest risk adjusted investment return possible for the investors. For example, the funds will borrow capital, through issuance of collateralized debt obligations or other institutional borrowings, with the debt being secured by the already owned life insurance policies. The leverage created through these borrowings and the tax benefits associated with the ownership of life insurance policies are intended to enhance the attractive returns that the funds provide to the funds' investors.

It is anticipated that some of the previous owners of the life insurance policies that have sold or exchanged their "obsolete" life insurance policies may be interested in purchasing new life insurance policies but using different insurance products or terms. For such individuals or entities, the current invention provides efficient means to do so.

In accordance with the present invention, the life insurance investment funds are managed to enhance their performance, protect downside investor risk, and generate cash value growth of the investment funds that is consistent with equity level returns with fixed income asset exposure. All these features are achieved while the acquired life insurance policies remain in force and, importantly, the insured lives persist. Further, the invention enables enhancement of risk adjusted investment returns and provides a series of planning tools through the use and application of leveraged and unleveraged exchange funds of life insurance policies.

In accordance with one embodiment of the invention, the funds are managed to maximize the funds' financial returns, provide protection against downside risk, and normalize death benefit cash flows by the following steps:

1. performing dynamic life insurance policy level reviews to determine if the life insurance policies meet the financial performance expectations set by the fund; and selling and/or surrendering the life insurance policies that fail to meet financial expectations;
2. to minimize the volatility in the financial return, using derivatives to "balance" a portfolio of
   a) fixed income life insurance, e.g. whole life insurance; and
   b) equity-based life insurance, e.g. variable life insurance,
3. selling equity in the fund and debt securities for cash and/or in exchange for life insurance policies. Additionally, debt securities can be sold to maximize the financial return and to provide a significant monetization of the cash values of the life insurance policies in a tax efficient manner;
4. purchasing additional life insurance policies or receiving additional exchanged life insurance policies that meet the financial objectives of the funds and their investors. As discussed above in the Acceptable Insurance Policies section, the fund will not acquire "newly issued" life insurance policies that are less than two years old; and
5. Using fund management techniques on a policy by policy basis, policies are managed to maximize investment returns. Each life insurance policy will be managed by the funds as a discrete security that is in the same manner as investment funds are holding and managing corporations' shares. These techniques may include the following:
   a) optimizing the frequency/incidence of premiums;
   b) optimizing the timing of premiums;
   c) optimizing the amount of premiums;
   d) fully surrendering life insurance policies;
   e) partially surrendering life insurance policies;
   f) changing coverage options;
   g) changing investment options;
   h) changing dividend options;
   i) using loan provisions options;
   j) using non-forfeiture options;
   k) using other settlement options;
   l) extending maturity;
   m) using debt;
   n) managing debt to assets;
   o) managing cash flow; and
   p) using derivatives to change beta of the portfolio and, etc.

Figure 5:
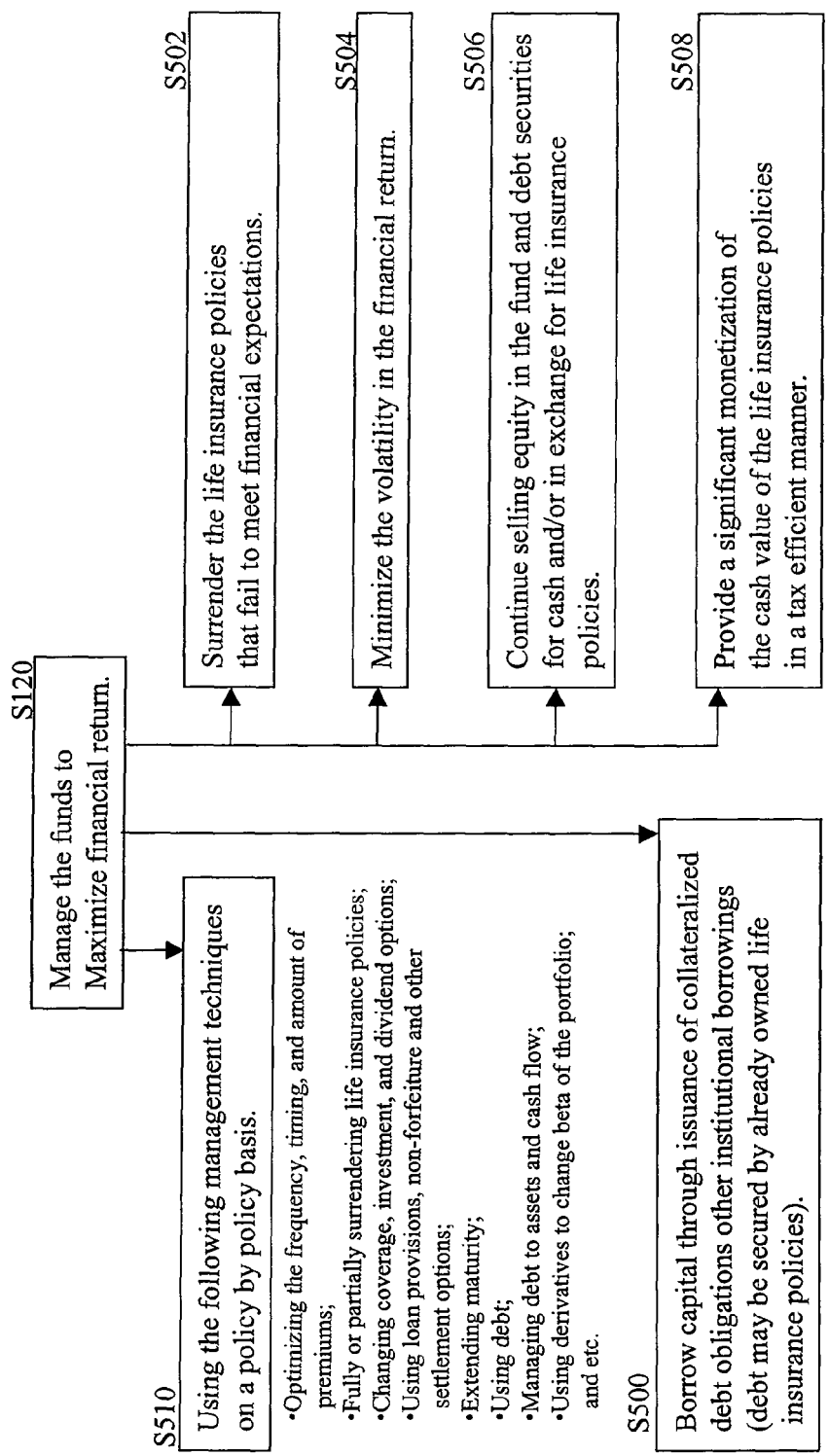
FIG. 5 is a flowchart showing the steps of life insurance policy fund management by adherence to rules set by an embodiment of the present invention.

The steps used in management of the funds are shown in FIG. 5. Step S500 illustrates that the funds will be borrowing capital through issuance of collateralized debt obligations and other institutional borrowings.

In step S502 the life insurance policies that fail to meet financial expectations may be surrendered. In step S504 volatility in the financial return is minimized. In step S506 equity in the fund and debt securities is continuously sold for cash and/or in exchange for life insurance policies. In step S508 a significant monetization of the cash value of the life insurance policies in a tax efficient manner is provided. The owners of life insurance policies making up the fund may choose to purchase new life insurance policies tailored to their needs. However, as discussed above, "newly issued" life insurance policies will not be accepted in the funds.

Finally, in step S510 additional management techniques are shown which are envisioned for use on a policy by policy basis, not case by case, or carrier to carrier. These techniques may include the following:

- optimizing the frequency, timing, and amount of premiums;
- fully or partially surrendering life insurance policies;

changing coverage, investment, and dividend options;
using loan provisions, non-forfeiture and other settlement options;
extending maturity;
using debt;
managing debt to assets and cash flow;
using derivatives to change beta of the portfolio; and etc.

In particular, a criteria for premium payment in accordance with an embodiment of the present invention may include the following steps:
1. paying premium if an increase in a cash value due to a payment of the premium is at least equal to a predefined percentage of the premium;
2. on a continuing basis, comparing internal rate of return with and without death, to determine if the premium should be:
   a. paid—in cash, by withdrawal of policy values (must specify source), by internal borrowing, and by external borrowing;
   b. not paid—policy goes to reduced paid up Whole Life and policy goes to extended term Whole Life; and
   c. skipped or deferred entirely; and
3. comparing internal rate of return across a single life insurance policy, multiple life insurance policies with similar product type, and multiple life insurance policies with different product type.

In an example of one embodiment of the present invention returns may be managed or maximized in accordance with the following steps for Variable Universal Life policies:
1. determine composition of each allocation strategy, i.e., conservative, moderate, and aggressive;
2. for each product, review the subaccounts by asset class, consider:
   experience, tenure, assets under management of fund manager,
   performance—historical returns vs. peer fund managers vs. market indices,
   standard deviations,
   alphas/betas,
   expense ratios,
   Morningstar ratings, and
   industry weightings;
3. eliminate subaccounts that do not meet minimum criteria;
4. rank subaccounts by asset class across all carriers;
5. apply allocation strategy to "best available" subaccounts, i.e. waterfall;
6. work with investment adviser to hedge downside risk and negotiate fees;
7. identify gaps or deficiencies in subaccount offering; identify existing subaccounts or work with fund families to create new subaccounts that can fill those gaps; negotiate with various carriers to add these subaccounts
8. monitor subaccount performance daily;
9. review
   composition of strategy at least monthly,
   each carrier's guaranteed interest and loan account crediting rates monthly,
   strategy at least quarterly, and
   cost of hedges at least quarterly;
10. if any subaccount consistently underperforms relative to benchmarks, review allocation percentage to that subaccount monthly, and take appropriate actions at least quarterly; and
11. negotiate with various carriers for fee and other cost reductions, as appropriate.

Returns for Whole Life policies may be managed or maximized in accordance with the following steps:
1. conduct annual survey of anticipated dividend actions;
2. determine impact on fund performance by obtaining in-force illustrations or, if not available, projections;
3. review allocation strategy between Whole Life and Variable Universal Life products at least annually;
4. obtain in-force illustrations or perform scenario testing to determine if any changes, such as, how dividends are applied, whether to pay premiums, etc. need to occur; and
5. implement changes as needed, by insured, product, carrier For managing or maximizing both Whole Life and Variable Universal Life products the following steps are used:
1. reports from rating agencies are monitored to detect potential negative statements and/or downgrades;
2. smoothing incidence of death claims and creating more regular cash flow by pooling more lives;
3. mitigating carrier risk by spreading policies across multiple insurance companies; and
4. diversifying investment risk by product type, equity, and fixed income styles.

It is further understood that those skilled in the art can easily implement processes, procedures, and steps discussed in this application as computer controlled programs of instructions executed on commonly used computing devices. These computing devices may include single and/or multiple processor; single and/or multiple storage devices; memory in the amount sufficient to execute the method of the invention; any necessary peripheral, input, and other essential devices. Further, the computing devices may be used as a stand-alone unit or distributed over local or wide area networks, e.g., the Internet.

The computer programs may, for example perform the steps for selecting the life insurance policies to populate the funds; perform acquisition of the selected life insurance policies; and perform the steps necessary to manage the funds, for example to maximize a financial risk adjusted investment rate of return that provides equity level returns with fixed income asset exposure.

Although the present invention has been described in relation to particular embodiments thereof, many other variations and modifications and other uses will become apparent to those skilled in the art. It is preferred, therefore, that the present invention not be limited by the specific disclosure herein.

What is claimed is:
1. A method of funding and managing at least one fund of a plurality of diverse life insurance policies issued by a plurality of investment grade carriers, the at least one fund providing enhanced risk adjusted investment return, the at least one fund having owners, the method being implemented on at least one computing device executing software processes, the software processes performing instructions comprising the steps of:
   selecting, using computer enabled instructions executed by the at least one computing device, the plurality of life insurance policies for the at least one fund without underwriting on the lives of the insured of each life insurance policy, said step of selecting based on a cash value analysis of the life insurance policies to identify those policies with viable projected cash value streams and that can be positively impacted to improve the cash value streams;
   acquiring, using computer enabled instructions executed by the at least one computing device, the selected plurality of life insurance policies for the at least one fund, wherein benefits of life insurance policy ownership pass to the owners of the at least one fund; and managing the fund, using computer enabled instructions executed by the at least one computing device, to maximize a financial risk adjusted investment rate of return that provides equity level returns with fixed income asset exposure.

2. The method of claim 1, wherein a criteria based on which underwriting is not performed in the selecting step is selected from at least one of medical, lifestyle, financial, personal, and random underwriting.

3. The method of claim 1, wherein the selecting step selects one or more life insurance policies from a broad range of a plurality of life insurance companies in accordance with a plurality of rules that prevent selection of life insurance policies:
   issued less than two years prior to the selection;
   not issued with a broad range of investment grade "claims paying" ratings;
   on an insured who is under 21 years of age;
   not designed for maximum persistency;
   that do not cover a broad range of risk classes selected from one of diversity of duration, product type, and insured ages and gender; or
   written on a "lapse supported" basis.

4. The method of claim 3, wherein the selecting step uses knowledge of financial characteristics of the plurality of life insurance companies and of the plurality of life insurance policies.

5. The method of claim 1, wherein the selecting step does not select one or more of:
   variable life insurance contracts purchased by trusts on the lives of a select group of employees covered by the trust;
   life insurance policies for a benefit of a foundation taken out on individual supporters of the foundation, the supporters being grouped in one or more blocks; and
   variable life insurance to fund 412(i) defined benefit plans.

6. The method of claim 1, wherein the selecting step further comprises the steps of:
   analyzing the financial characteristics of each life insurance policy by determining how monetization proceeds will be used and reviewing claims history, premium payment history, and subaccount allocation of said life insurance policy;
   discarding the life insurance policy if it is a modified endowment contract (MEC) for a leveraged fund;
   determining historical internal rate of return;
   discarding the life insurance policy if actual returns exceed the current historical internal rate of return under an allocation strategy of the at least one fund;
   projecting future death claims and future cash value growth of said life insurance policy;
   assessing an impact of accepting this life insurance policy having said projections on the at least one fund's other life insurance policies; and
   accepting the life insurance policy if that allocation limit percentage or the allocation of whole life policies are not exceeded.

7. The method of claim 6, wherein historical internal rate of return is determined on a continued basis with and without death claims.

8. The method of claim 6, wherein the impact is selected from one of an effect on distribution by insurance company, product type, death benefit, policy duration, subaccount offering, and concentration of risk.

9. The method of claim 6, wherein life insurance policies that are accepted in the at least one fund from one carrier are limited by a preset percentage.

10. The method of claim 1, wherein if an original purpose of the life insurance policy is other than to benefit an insured, the selecting step further comprises the steps of:
    reviewing characteristics of the life insurance policy selected from a benefit being funded, a liability being unfunded, financials of an owner corporation if the life insurance policy is owned by the corporation, titles of the insured, geographical distribution, issue date of policies, and state in which the life insurance policy issued;
    discarding the life insurance policy if any of the reviewed characteristics are improper according to fund parameters set to industry standards;
    determining an average age of insured and dispersion of actual ages around the mean;
    comparing an actual male/female ratio to an underlying life insurance policy guaranteed mortality table; and
    determining a total death benefit by age.

11. The method of claim 10, wherein in the comparing step the life insurance policy is discarded if the ratio does not coincide with a mortality table assumption from a unisex mortality table.

12. The method of claim 1, wherein the selecting step further comprises the steps of determining rules for selecting the life insurance policies for the at least one fund.

13. The method of claim 12, wherein the rules consider at least one of: a mortality and expense risk charge, a policy change provision, a load structure Universal Life/Variable Universal Life, a loan provision, a finance charge, broker compensation rates, how the compensation rates are reflected in policy loads; a premium tax rate; a deferral of payment provision; a guaranteed interest account, a current cost of insurance rate structure; and assessment of subaccount offerings.

14. The method of claim 1, wherein the selecting step further comprises the steps of analyze characteristics of the insurer companies, the characteristics being selected from at least one of financial strength ratings, history of dividend performance, expected future dividend performance, strength of management, and commitment to customers.

15. The method of claim 14, wherein the at least one fund comprises institutional knowledge of the industry held by persons skilled in the art, which allows the at least one fund to effectively gather and analyze the characteristics and provide added value and enhanced risk adjusted investment rates of equity level returns with fixed income asset exposure.

16. The method of claim 14, wherein the characteristics of the insurer companies from which life insurance policies are accepted into the at least one fund are U.S. domiciled;
    have investment grade rating and a history of policy dividend actions;
    assess financial strength of insurance companies and supportability of current dividend scale;
    provide access to policy information on-line or telephone automation, ease of adding new subaccounts, quick turn around to process service requests, an additional amount of guaranteed issue, and an additional amount under retention limits and reinsurance programs; and
    offer private placement products.

17. The method of claim 1, wherein the acquiring step accepts initial equity from investors in the fund.

18. The method of claim 17, wherein the acquiring step comprises the steps of:
    issuing a plurality of debt obligations; and
    receiving equity from purchasers of the plurality of debt obligations.

19. The method of claim 1, further comprising acquiring selected life insurance policies for cash.

20. The method of claim 19, wherein an amount to pay for the selected life insurance policies is calculated based on the cash surrender value of the selected life insurance policies.

21. The method of claim 1, wherein the managing step further comprises a step of using a fund management technique selected from one of
optimizing the frequency of premiums; optimizing the timing of premiums;
optimizing the amount of premiums; fully surrendering life insurance policies;
partially surrendering life insurance policies; changing coverage options;
changing investment options; changing dividend options; using loan provisions options;
using non-forfeiture options; using other settlement options; extending maturity;
using debt; managing debt to assets; managing cash flow; and
using derivatives to change beta of the portfolio.

22. The method of claim 1, wherein the managing step further mitigates a downside investment risk, enhances performance of underlying fund life insurance policies, normalizes death benefit cash flows and creates equity level returns with fixed income asset exposures.

23. The method of claim 1, wherein by maximizing a financial risk adjusted investment rate of return the managing step prevents early termination of life insurance policies by allowing owners to monetize investments in their life insurance policies without requiring execution of viatical agreements, thereby preventing ownership of existing life insurance policies by third parties and encouraging retention of the original life insurance policies.

24. The method of claim 1, wherein by maximizing a financial risk adjusted investment rate of return the managing step
avoids requiring medical, lifestyle, or personal underwriting of the lives insured; and
avoids relying on the expected near term mortality of the lives insured as the source of investment returns.

25. The method of claim 1, wherein the managing step further comprising the steps of:
paying premium if an increase in a cash value due to a payment of the premium is at least equal to a predefined percentage of the premium;
continuously comparing an internal rate of return with and without death to determine if the premium should be paid, skipped, or deferred; and
comparing internal rate of return across a single life insurance policy, multiple life insurance policies with similar product type, and multiple life insurance policies with different product type.

26. The method of claim 25, wherein the premium is paid in cash, by withdrawal of policy values, by internal borrowing, or by external borrowing.

27. The method of claim 1, wherein the managing step further maximizes returns for Variable Universal Life insurance policies by performing at least one of
determining composition of an allocation strategy selected from one of conservative, moderate, and aggressive;
reviewing subaccounts for the at least one fund;
eliminating subaccounts that do not meet minimum criteria;
ranking subaccounts by an asset class across all insurance companies;
applying the allocation strategy to best available subaccounts;
working with at least one investment adviser to hedge downside risk and negotiate fees;
identifying deficiency gaps in subaccount offering;
identifying existing and creating new subaccounts to fill the gaps;
negotiating with a plurality of insurance companies to add the new subaccounts;
monitoring performance of the subaccounts daily;
reviewing composition of strategy at least monthly, each insurance company's guaranteed interest and loan account crediting rates monthly, strategy at least quarterly, and cost of hedges at least quarterly;
if any of the subaccounts consistently underperforms relative to benchmarks, reviewing allocation percentage to the underperforming subaccount monthly, and taking appropriate actions at least quarterly; and
negotiating with a plurality of insurance companies for fee and other cost reductions, as appropriate.

28. The method of claim 27, wherein the sub-accounts are reviewed by one of asset class selected from one of experience, tenure, assets under management of a fund manager; performance selected from one of historical returns vs. peer fund managers vs. market indices; standard deviations; alphas/betas; expense ratios; Morningstar ratings; and industry weightings.

29. The method of claim 1, wherein the managing step further comprising steps of maximizing returns for Whole Life insurance policies as follows:
annually surveying of anticipated dividend actions;
determining impact on performance of the at least one fund by obtaining at least one of in-force illustrations and projections;
at least annually reviewing allocation strategy between Whole Life and Variable Universal Life products;
determining if changes need to occur by performing at least one of obtaining in-force illustrations and scenario testing, the changes being selected from how dividends are applied and whether to pay premiums; and
implementing changes as needed, by insured, product, and insurance company.

30. The method of claim 1, further comprising a step of financing new life insurance policies for individuals and corporations that have sold their policies to the funds or exchanged their policies for an interest in the fund.

31. The method of claim 30, wherein the new life insurance policies are not acquired by the funds for a number of years after issue, if ever acquired.

* * * * *